(12) United States Patent
Aoshiba et al.

(10) Patent No.: US 7,195,246 B2
(45) Date of Patent: Mar. 27, 2007

(54) SEALING MATERIAL

(75) Inventors: Hiroshi Aoshiba, Arida (JP); Yasuji Kanou, Arida (JP)

(73) Assignee: Mitsubishi Cable Industries, Ltd., Hyogo (JP)

(*) Notice: Subject to any disclaimer, the term of this patent is extended or adjusted under 35 U.S.C. 154(b) by 62 days.

(21) Appl. No.: 11/061,664

(22) Filed: Feb. 22, 2005

(65) Prior Publication Data

US 2005/0184468 A1 Aug. 25, 2005

(30) Foreign Application Priority Data

Feb. 25, 2004 (JP) .............................. 2004-049265

(51) Int. Cl.
*F16J 15/32* (2006.01)
*F16J 9/00* (2006.01)

(52) U.S. Cl. .................... 277/438; 277/567; 277/589; 277/647

(58) Field of Classification Search ............... 277/438, 277/439, 530, 566, 567, 589, 647, 639
See application file for complete search history.

(56) References Cited

U.S. PATENT DOCUMENTS 4,103,909 A * 8/1978 Hoffman et al. ............ 277/520
4,143,883 A * 3/1979 Paynter ...................... 277/530
4,174,846 A * 11/1979 Scott .......................... 277/556
4,706,970 A * 11/1987 Ramirez ..................... 277/556
5,799,953 A * 9/1998 Henderson .................. 277/554
6,007,070 A * 12/1999 Heathcott et al. .......... 277/510
6,209,882 B1 * 4/2001 Riess .......................... 277/562
6,883,804 B2 * 4/2005 Cobb .......................... 277/549

FOREIGN PATENT DOCUMENTS

| JP | 5-47624 | 6/1993 |
|----|---------|--------|
| JP | 8-82372 | 3/1996 |
| JP | 2003-247646 | 9/2003 |

* cited by examiner

*Primary Examiner*—Alison K. Pickard
(74) *Attorney, Agent, or Firm*—Armstrong, Kratz, Quintos, Hanson & Brooks, LLP (57) ABSTRACT

A sealing material for sealing liquid composed of a seal main body of resin, having a U-shaped cross section and a concave groove opening to an axis direction, and an O-ring of rubber fit to the concave groove of the seal main body used for medical appliances and paint appliances. The seal main body is provided with an end lip portion on a side along the axis direction and a main lip portion on a middle position of the axis direction on a sliding face side, and, in a pressure-receiving state in which pressure works on the side along the axis direction and the O-ring is compressed, a dimension of the axis direction from a base end face of the seal main body on other side along the axis to a cross-section central point of the O-ring and another dimension of the axis direction from the base end face to an end portion of the main lip portion are set to be approximately equal.

9 Claims, 8 Drawing Sheets

SEALING MATERIAL

BACKGROUND OF THE INVENTION

1. Field of the Invention

This invention relates to a U-shaped sealing material (sealing member) for reciprocating or rotational movement.

2. Description of the Related Art

As a conventional sliding (moving) sealing material (sealing member) used for oil-hydraulic or pneumatic appliances, a material (seal) as described below is known. That is to say, the sealing material is composed of a resin ring having U-shaped cross section and a concave groove, and a metal spring fit to the concave groove (refer to Japanese provisional publication No. 8-82372, and No. 2003-247646, for example) or a elastic body of rubber (refer to Japanese provisional publication of utility model No. 5-47624), and, a stage of lip is formed on a sliding face of the resin ring.

However, when the conventional sealing material is applied to medical appliances and paint appliances, liquids used in these appliances mostly tend to solidify (painting materials such as paint) or include components easily crystallize (chemicals used for hemodialysis, for example), then, sealing ability is reduced by solidified and crystallized matter sticking to near portions of the lip since only one stage of lip is formed in the conventional sealing material.

Figure 9:
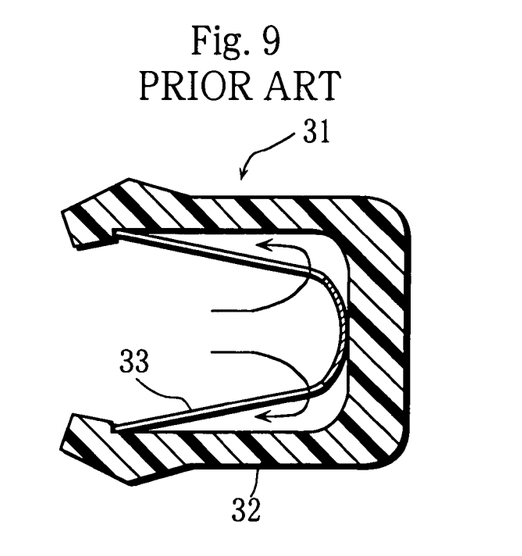
FIG. 9 is a cross-sectional view showing a conventional sealing material.

FIG. 9 shows a sealing material disclosed by the above Japanese provisional publication No. 8-82372. Bacteria may be propagated in the sealing material 31 in FIG. 9 because liquid tends to stay between a resin ring 32 and a metal spring 33 fit inside the ring and difficult to be washed off.

It is therefore an object of the present invention to provide a sealing material to seal liquids which tend to solidify and include components easily crystallize with which the sealing ability is maintained without solidified and crystallized matter sticking to near portions of the lip, the liquids do not stay in the groove of the seal main body, and cleaning is easily conducted.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
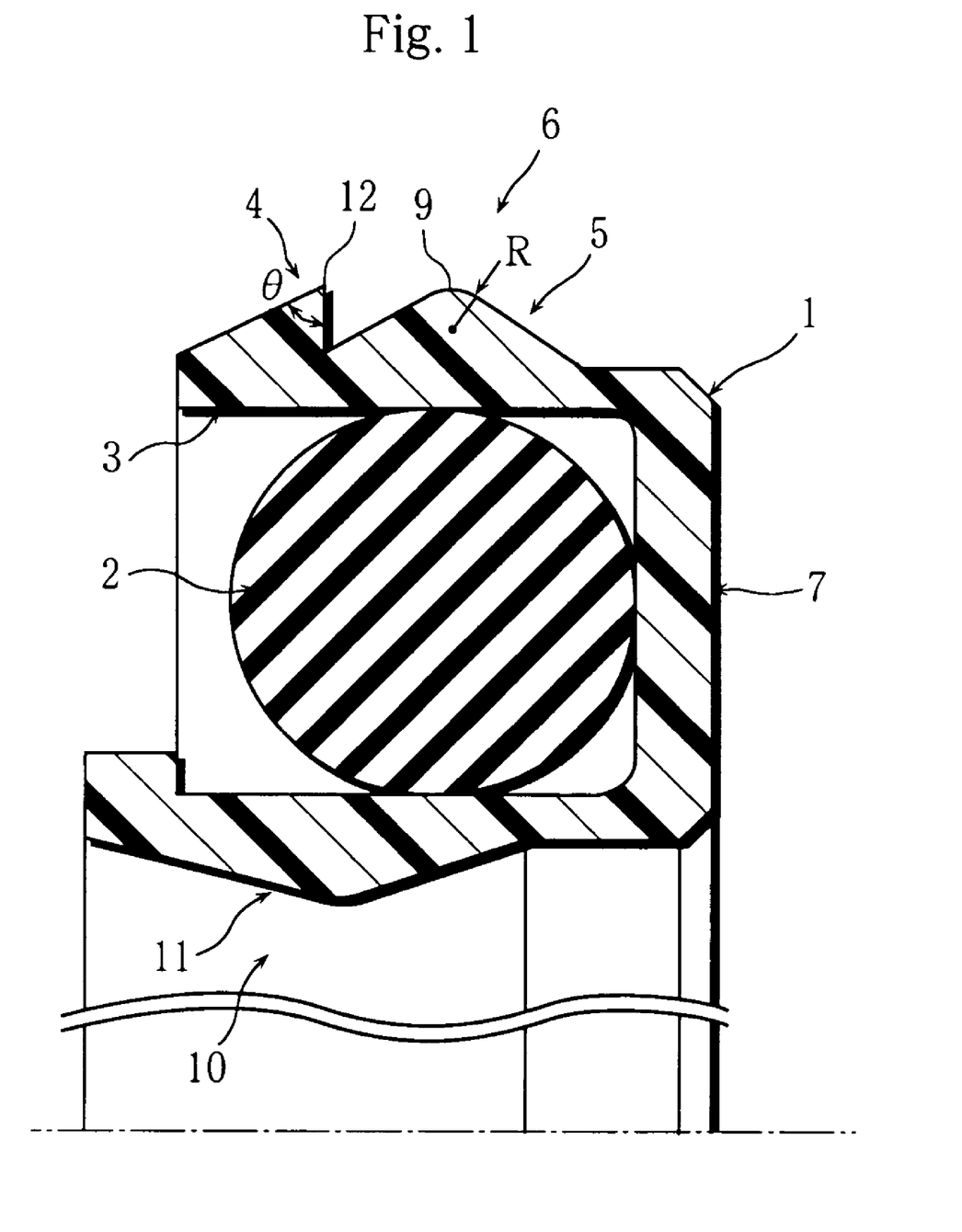
FIG. 1 is an enlarged cross-sectional view of a principal portion in a free state showing a first embodiment of the present invention.
Figure 2:
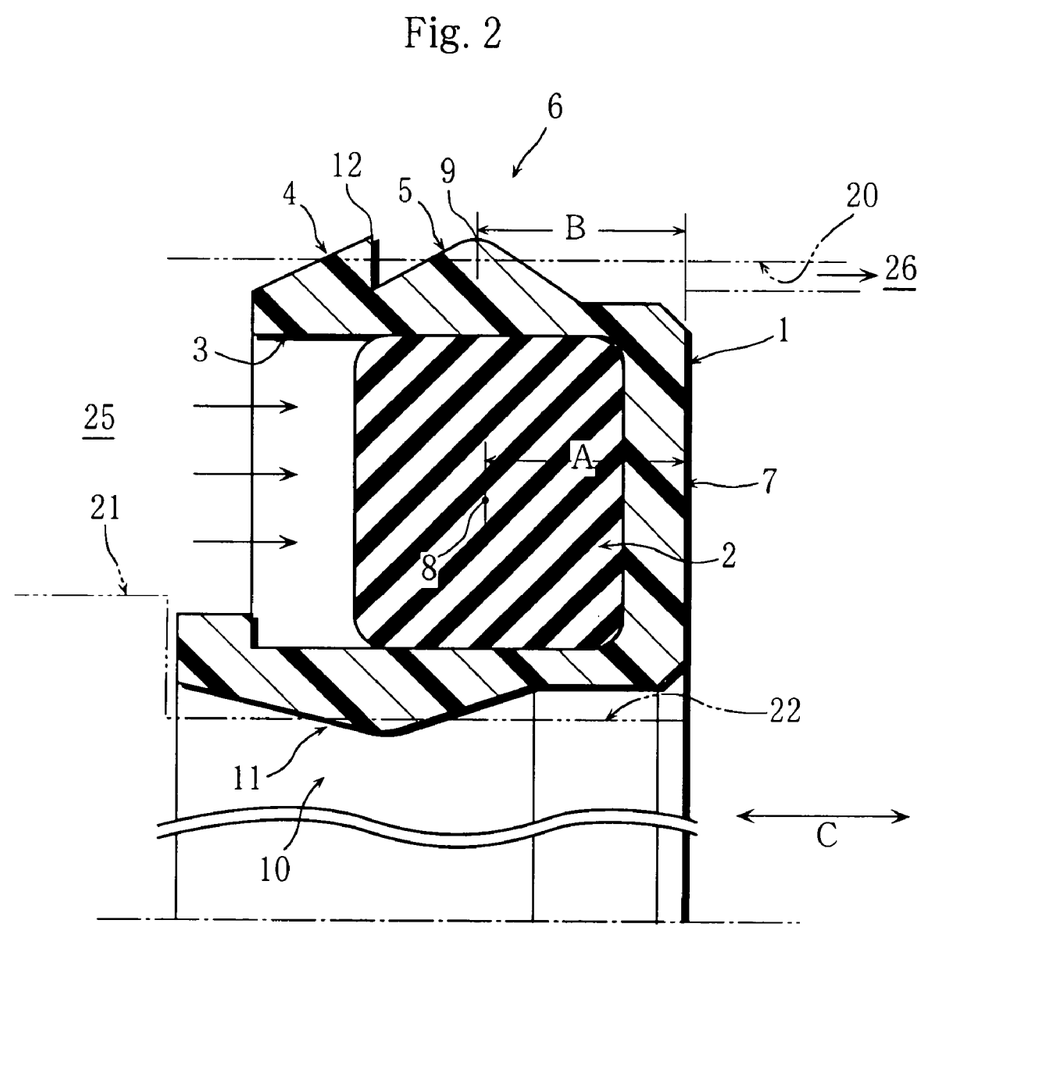
FIG. 2 is a virtual enlarged cross-sectional explanatory view of the principal portion in a state in which only an O-ring receives pressure.
Figure 3:
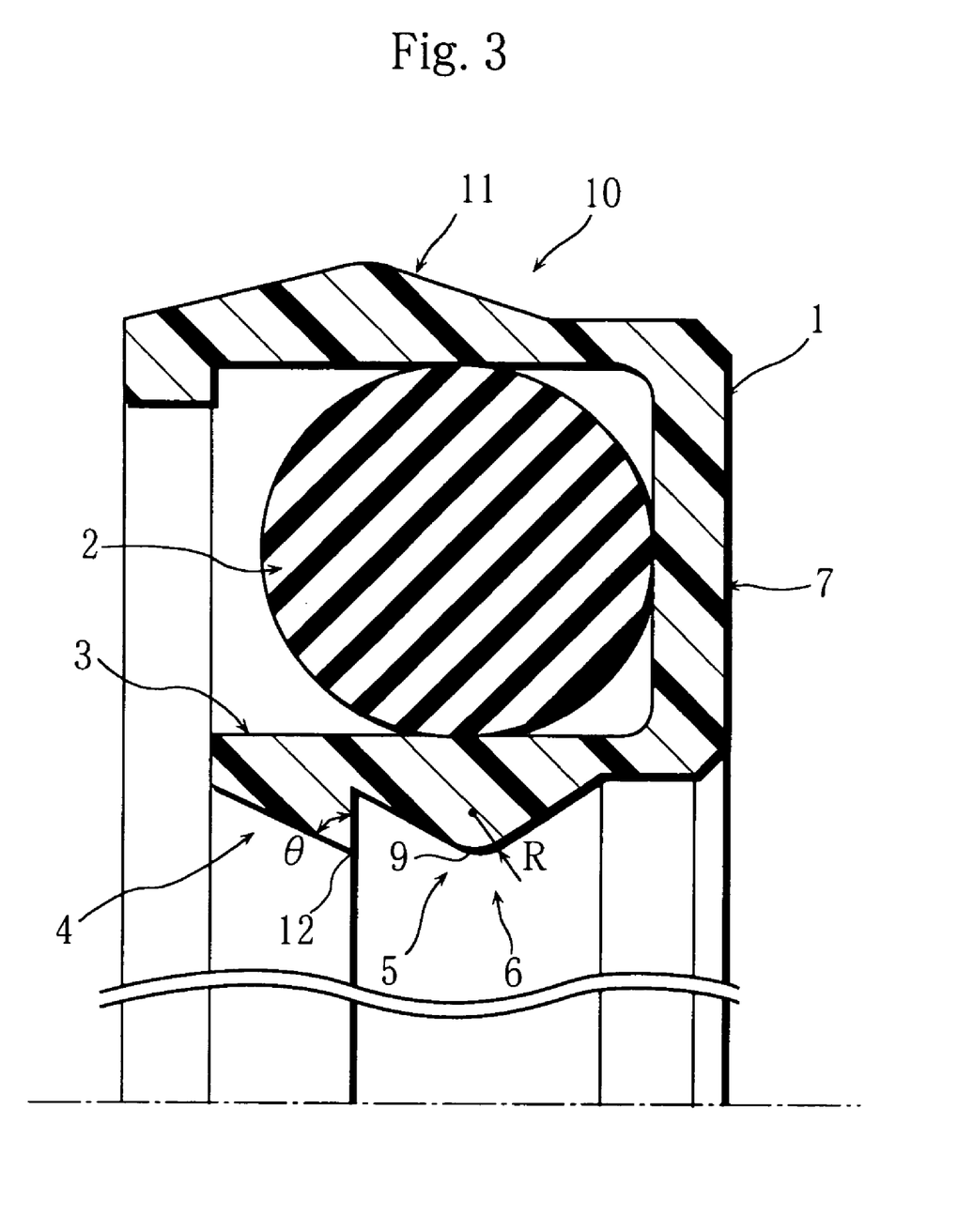
FIG. 3 is an enlarged cross-sectional view of a principal portion in a free state showing a second embodiment of the present invention.
Figure 4:
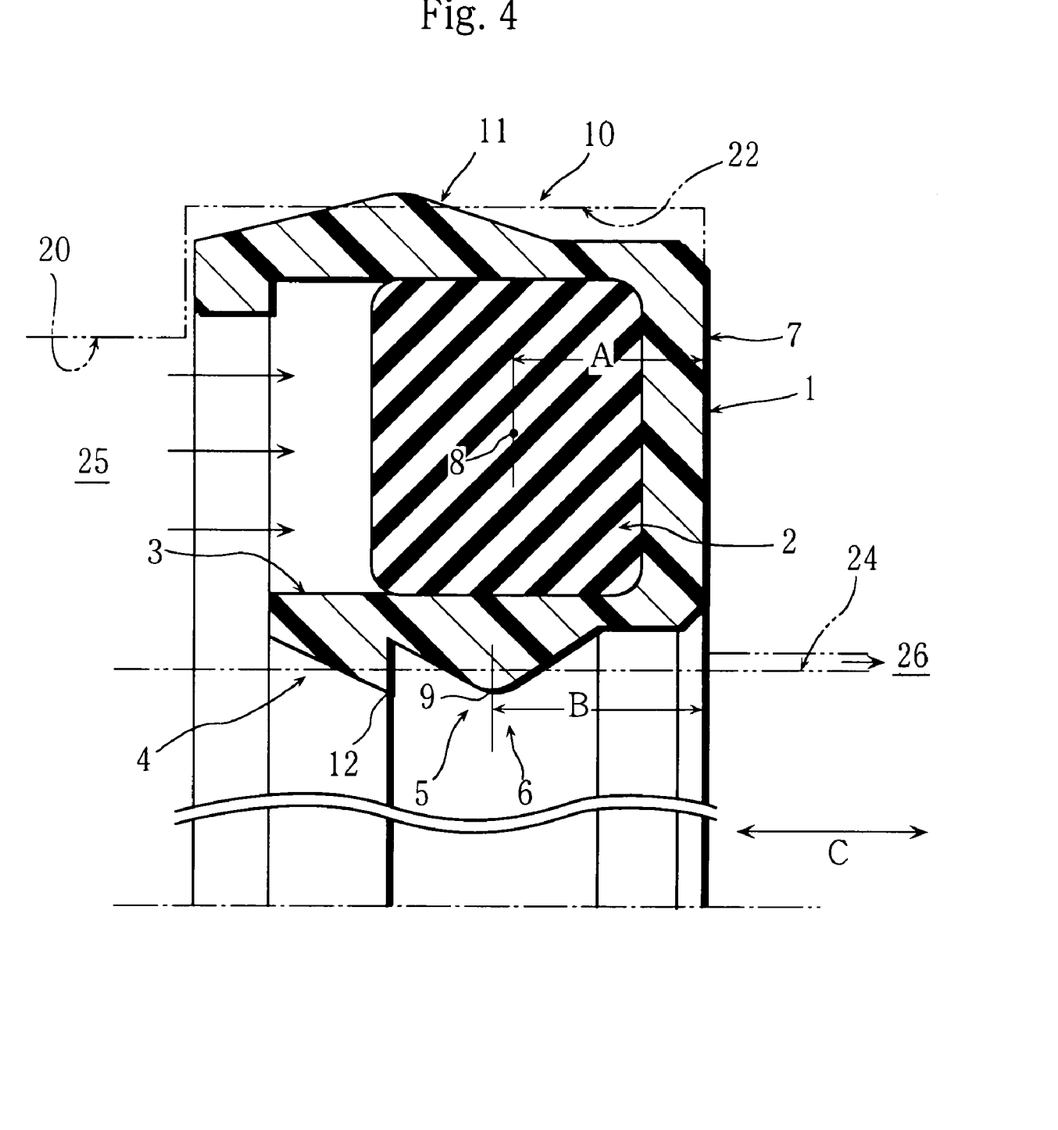
FIG. 4 is a virtual enlarged cross-sectional explanatory view of the principal portion in a state in which only an O-ring receives pressure.

FIG. 1 through FIG. 4 show first and second embodiments of the present invention. FIGS. 1 and 2 show the first embodiment in which an attachment groove 22 of ring is formed on a peripheral face of a piston 21 reciprocating in a cylinder tube 20 and the material (seal) is attached to the attachment groove 22, and FIGS. 3 and 4 show the second embodiment in which an attachment groove 22 of ring is formed on an inner peripheral face of the cylinder tube 20 (on the head) and the seal is attached to the attachment groove 22. The piston 21 and a piston rod 24 reciprocate in the directions shown by arrows C, and liquid, which tends to solidify or crystallize, is sealed in a fluid-storing space 25 in the cylinder tube 20 (not shown in Figures).

FIG. 1 and FIG. 3 show a free state, namely, a state before the sealing material (seal) of the present invention, applied to medical appliances and paint appliances for sealing liquid, is attached to the attachment groove 22. And, FIG. 2 and FIG. 4 are (virtual) enlarged cross-sectional explanatory views showing a state in which a seal main body 1 is drawn as in the free state, and only an O-ring 2 of rubber is receiving pressure from the fluid-storing space 25 and compressed.

To describe concretely, the sealing material (sealing member) relating to the present invention is composed of the seal main body 1 of U-shaped cross section, having a concave groove 3 opening to an axis direction, and the O-ring 2 of rubber fit to the concave groove 3. The opening end of the concave groove 3 is directed to the fluid-storing space 25 in which liquid is sealed. As the material of the seal main body 1, a resin composed of at least one of PTFE, polyamide resin, and polyethylene resin. And, the O-ring 2 is made of, for example, silicone rubber.

The seal main body 1 has an end lip portion 4 and a main lip portion 5 on a sliding face 6 side, and the main lip portion 5 is disposed on the other axis direction side to the end lip portion 4. An end portion 12 of the end lip portion 4 and an end portion 9 of the main lip portion 5 contact members (such as an inner face of the cylinder tube 20 in FIG. 2 and a peripheral face of the piston rod 24 in FIG. 4) on which the lip portions slide, and become slightly compressed and deformed (not shown in Figures) in comparison with the solid lines in FIG. 2 and FIG. 4.

The end lip portion 4 inclines as its thickness dimension increases toward the other axis direction side, and the end portion 12 of the end lip portion 4 is formed as a sharp edge. That is to say, the end lip portion 4 is triangular inclining to a low pressure (atmosphere) side 26, and a cross-sectional angle θ of the end portion of the end lip portion 4 is set to be an acute angle ($0° < θ < 90°$). If the angle θ is set to be more than 90°, the end lip portion 4 hardly prevents solidified and crystallized matters from intruding to the sliding face 6.

The cross-sectional configuration of the main lip portion 5 is triangular in which the end portion 9 is rounded, and a radius of curvature R of the end portion of the main lip portion 5 is set to be 0.15 mm $\leq$ R $\leq$ 0.4 mm. It is more preferable to set the R to be 0.2 mm $\leq$ R $\leq$ 0.3 mm. When R is smaller than the minimum value, contact pressure becomes excessive and the seal is rapidly abraded. On the contrary, when R is over the maximum value, sealing ability (sealability) is reduced.

An attachment face 10, on an opposite side to the sliding face 6 of the seal main body 1, contacts the attachment groove 22, a fixed-side lip portion 11 is formed on the attachment face 10, and the cross section of the lip portion 11 is triangular of which end portion is rounded.

Maximum pressure in a normal operational state works on the opening end side of the concave groove 3 to compress the O-ring 2 in pressure-receiving state (FIG. 2 or FIG. 4). In the pressure-receiving state, a dimension A in the axis direction, from a base end face 7 (on the low pressure side 26) in the other axis direction of the seal main body 1 to a cross-section central point 8 of the O-ring 2, and a dimension B in the axis direction, from the base end face 7 to the end portion 9 of the main lip portion 5, are set to be approximately same. "Approximately same" is defined in the present invention as that the dimension B is within a range of minus 10% to plus 10% of the dimension A (0.9×A≦B≦1.1×A).

As described above, the main lip portion 5 and the end lip portion 4 are disposed on the peripheral side of the seal main body 1 in FIG. 1 and FIG. 2, and the main lip portion 5 and the end lip portion 4 are disposed on the inner peripheral side of the seal main body 1 in FIG. 3 and FIG. 4.

Figure 5:
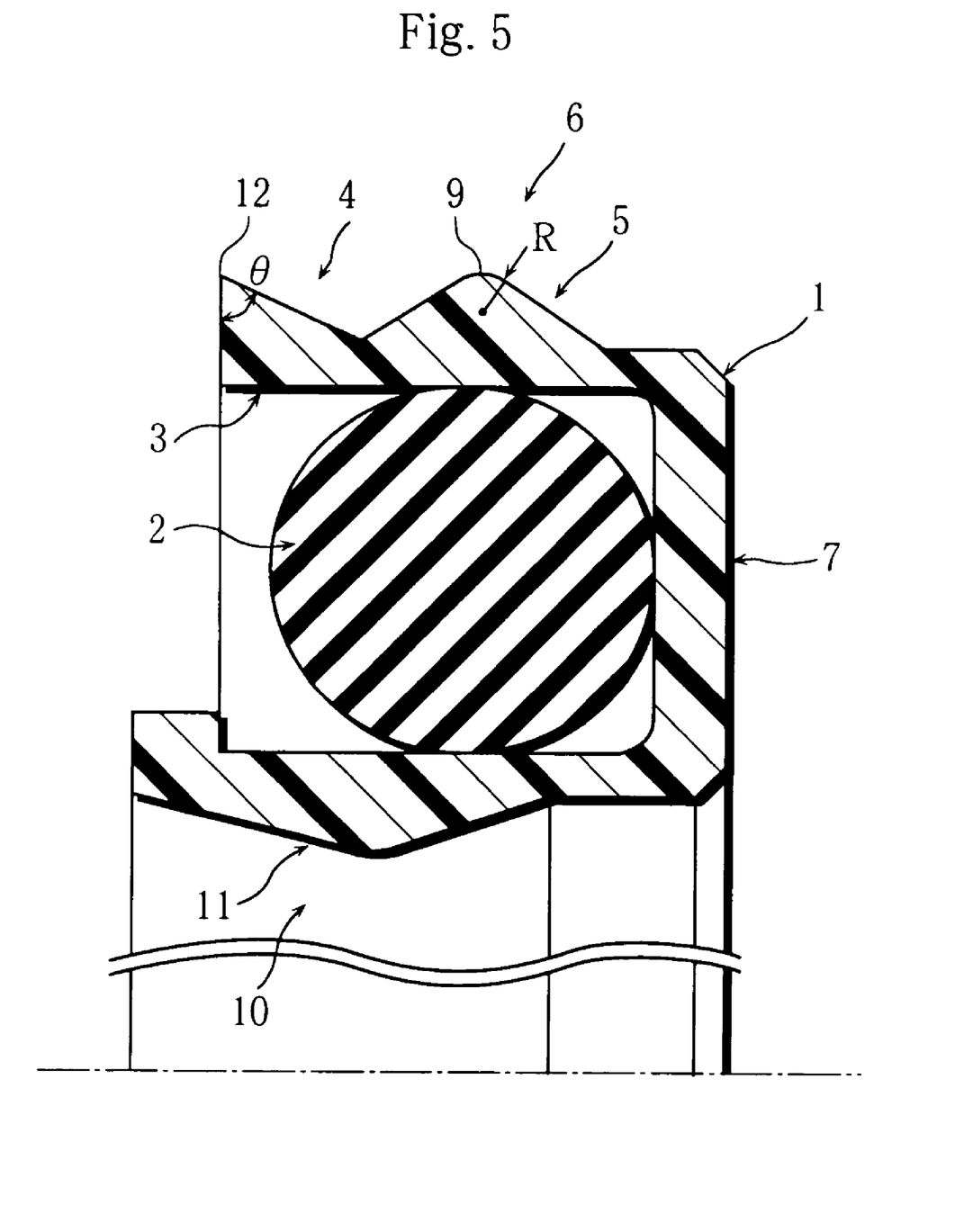
FIG. 5 is an enlarged cross-sectional view of a principal portion in a free state showing a third embodiment of the present invention.
Figure 6:
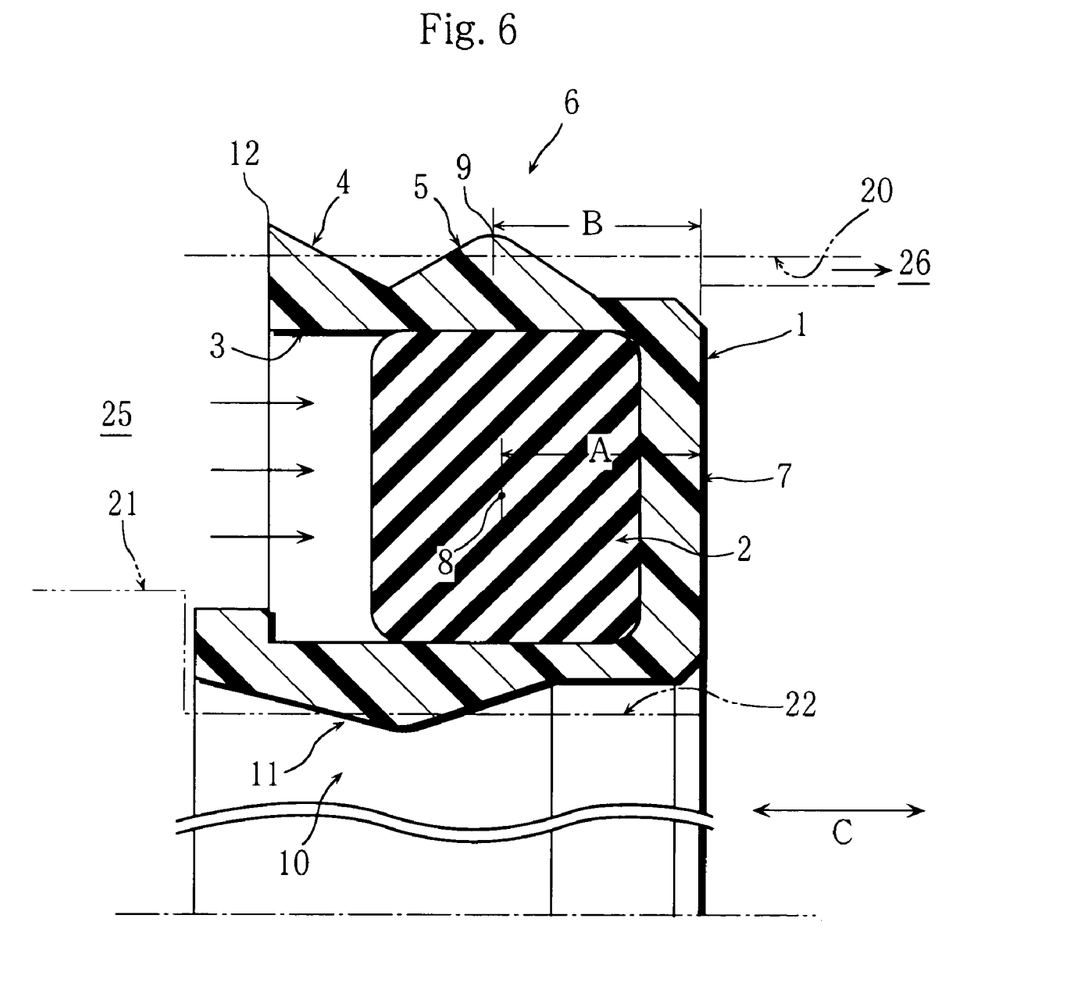
FIG. 6 is a virtual enlarged cross-sectional explanatory view of the principal portion in a state in which only an O-ring receives pressure.
Figure 7:
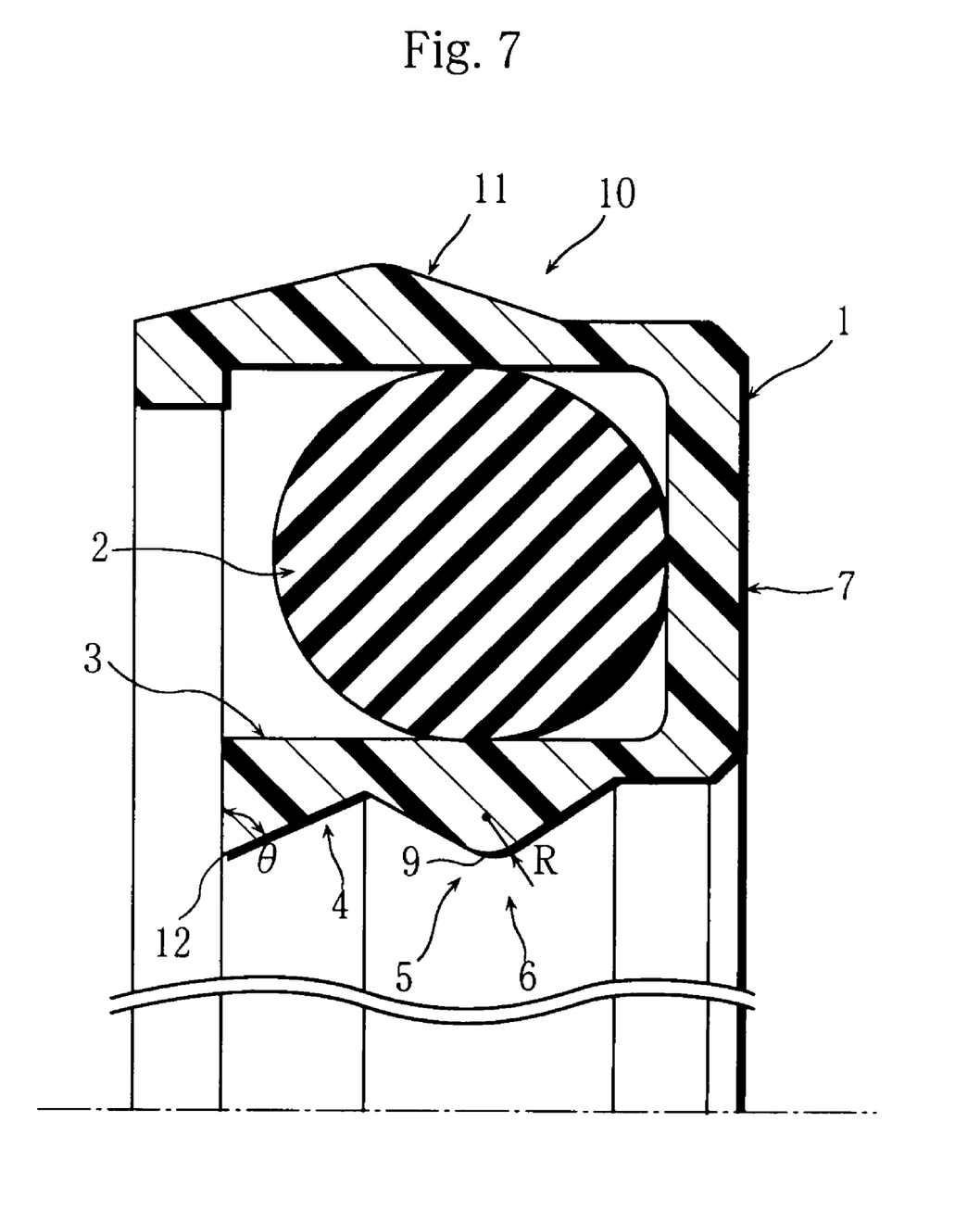
FIG. 7 is an enlarged cross-sectional view of a principal portion in a free state showing a fourth embodiment of the present invention.
Figure 8:
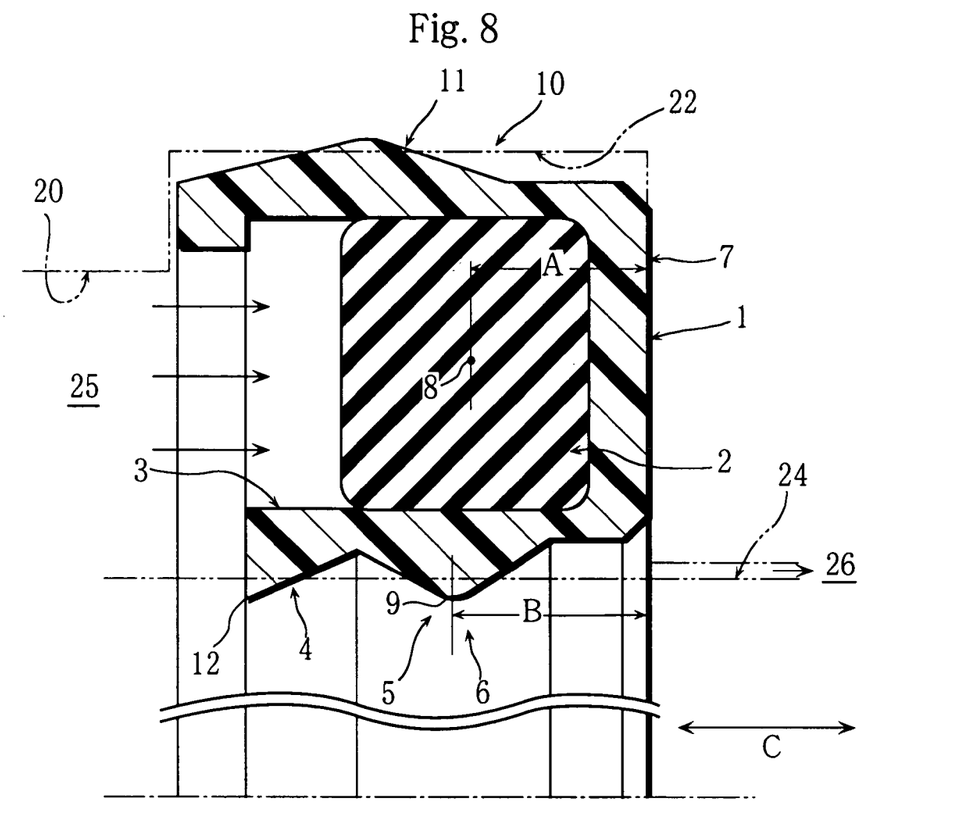
FIG. 8 is a virtual enlarged cross-sectional explanatory view of the principal portion in a state in which only an O-ring receives pressure.

FIGS. 5 through 8 show a third embodiment and a fourth embodiment, FIG. 5 and FIG. 6 show the third embodiment in which the attachment groove 22 is a ring formed, for instance, on the peripheral face of the piston 21 reciprocating in the cylinder tube 20, and the seal is attached to the attachment groove 22. FIG. 7 and FIG. 8 show the fourth embodiment in which the attachment groove 22 is a ring formed, for instance, on the inner peripheral face (of the head) of the cylinder tube 20, and the seal is attached to the attachment groove 22.

FIG. 5 and FIG. 7 show a free state, and FIG. 6 and FIG. 8, showing a pressure-receiving state, are virtual enlarged cross-sectional views showing the seal main body 1 in the free state. The end lip portion 4 inclines as its thickness dimension decreases toward the other axis direction. In FIGS. 5 through 8, explanations of members of same marks as in FIGS. 1 and 2, similarly constructed as in FIGS. 1 and 2, are omitted. Although the direction of the inclination of the end lip portion 4 in the third embodiment is different from the direction in the first embodiment, the end lip portions 4 of the third and the fourth embodiments are further effective to prevent solidified and crystallized matters from intruding to the sliding face 6.

An operation method (function) of the sealing material (seal) of the present invention is described.

In FIGS. 1 and 2 or FIGS. 3 and 4, the sealing material relating to the present invention is attached to the attachment groove 22. In this case, the O-ring 2 is (although not shown in Figures) slightly compressed.

Then, when the pressure of the liquid in the fluid-storing space 25 increases to make the above-mentioned pressure-receiving state, the O-ring 2 presses the seal main body 1 in the concave groove 3 by the pressure of the liquid in a direction at right angles with the sliding directions C. And, the end portion 12 of the end lip portion 4 and the end portion 9 of the main lip portion 5 press the relatively sliding members, and the end portion of the fixed-side lip portion 11 presses the inner face of the attachment groove 22. Therefore, the end lip portion 4 prevents solidified and crystallized matters from intruding to the main lip portion 5 side, and the main lip portion 5 prevents the liquid from leaking out to the low pressure (atmosphere) side 26.

As described above, the end lip portion 4 prevents solidified and crystallized matters from intruding to the main lip portion 5 side, and the solidified and crystallized matters do not stick to positions near the main lip portion 5; because the sealing material (seal) of the present invention is composed of the seal main body 1 of resin having the U-shaped cross section and the concave groove 3 opening to the direction along the axis, and the O-ring of rubber fit to the concave groove; the seal main body 1 is provided with the end lip portion 4 on one side along the axis and the main lip portion 5 on a middle position along the axis both of which are on the sliding face; and the dimension A in the axis direction, from the base end face 7 in the other axis direction of the seal main body 1 to the cross section central point 8 of the O-ring 2, and the other dimension B in the axis direction, from the base end face 7 to the end portion 9 of the main lip portion 5, are set to be approximately same in the pressure-receiving state in which pressure works on the axis direction side and the O-ring 2 is compressed. Therefore, the main lip portion 5 can prevent the liquid from leaking out to the low pressure (atmosphere) side 26.

And, sealing ability of the main lip portion 5 can be improved because elastic force of the O-ring 2 sufficiently works on the end portion 9 of the main lip portion 5 in the above pressure-receiving state, Further, because of fitting of the O-ring 2 to the concave groove 3, the liquid is pushed out of a space between an inner portion of the concave groove 3 and the O-ring 2, the liquid does not stay in the space, and bacteria are not propagated (a significant point for medical appliances). And, the O-ring 2 and the seal main body 1 can be easily washed because the O-ring 2 can be easily detached from the U-shaped seal main body 1.

And, the end lip portion 4 scrapes and prevents solidified and crystallized matters from intruding to the main lip portion 5 side, and the main lip portion 5 can tightly seal the liquid without early abrasion because the cross-sectional angle θ of the end portion of the end lip portion 4 is set to be an acute angle in free state, and the radius of curvature R of the end portion of the main lip portion 5 is set to be 0.15 mm to 0.4 mm in free state.

Even if the seal main body 1 is used in chemicals or under high temperature, the end lip portion 4 can prevent solidified and crystallized matters from intruding to the main lip portion 5 side, and the main lip portion 5 can prevent the liquid from leaking out to the low pressure (atmosphere) side 26.

Even if the O-ring 2 is used in chemicals or under high temperature, the O-ring 2 can elastically press the seal main body 1 from the concave groove 3 in the pressure-receiving state, and the main lip portion 5 can sufficiently seal the liquid. The sealing material relating to the present invention is especially preferable to a pump of hemodialysis system without bacteria propagation (as described above), and easy cleaning makes the sealing material preferable further.

While preferred embodiments of the present invention have been described in this specification, it is to be understood that the invention is illustrative and not restrictive, because various changes are possible within the spirit and indispensable features.

What is claimed is:

1. A sealing material for sealing liquid, used for medical or paint appliances, composed of a seal main body of resin having a U-shaped cross section and a concave groove opening to a direction along an axis, and an O-ring of rubber fit to the concave groove comprising a construction in which:

the seal main body is provided with an end lip portion on one side along the axis and a main lip portion on a middle position along the axis both of which are on a sliding face;

a dimension in the axis direction, from a base end face in another axis direction of the seal main body to a cross section central point of the O-ring, which is placed on an opening side of the concave groove in a free state, and another dimension in the axis direction, from the base end face to an end portion of the main lip portion, are set to be approximately the same in a pressure-receiving state in which pressure works on the opening direction of the concave groove and the O-ring is compressed toward a low pressure side; and a cross-sectional angle of an end portion of the end lip portion is set to be an acute angle in the free state.

2. The sealing material as set forth in claim 1, wherein a radius of curvature of the end portion of the main lip portion is set to be 0.15 mm to 0.4 mm in free state.

3. The sealing material as set forth in claim 1 or claim 2, wherein the seal main body is composed of at least one kind of resin chosen from PTFE, polyamide resin, and polyethylene resin.

4. The sealing material as set forth in claim 3, wherein the O-ring is composed of silicone rubber.

5. The sealing material as set forth in claim 4, wherein the sealing material is used for a pump of a hemodialysis system.

6. The sealing material as set forth in claim 3, wherein the sealing material is used for a pump of a hemodialysis system.

7. The sealing material as set forth in claim 1 or claim 2, wherein the O-ring is composed of silicone rubber.

8. The sealing material as set forth in claim 7, wherein the sealing material is used for a pump of a hemodialysis system.

9. The sealing material as set forth in claim 1 or claim 2, wherein the sealing material is used for a pump of a hemodialysis system.

* * * * *